(12) United States Patent
Haugen et al.

(10) Patent No.: US 8,587,472 B2
(45) Date of Patent: Nov. 19, 2013

(54) FULL-WAVE RECEIVER ARCHITECTURE FOR THE HOMODYNE MOTION SENSOR

(75) Inventors: Peter C. Haugen, Livermore, CA (US); Gregory E. Dallum, Livermore, CA (US); Patrick A. Welsh, Manteca, CA (US); Carlos E. Romero, Livermore, CA (US)

(73) Assignee: Lawrence Livermore National Security, LLC., Livermore, CA (US)

( * ) Notice: Subject to any disclaimer, the term of this patent is extended or adjusted under 35 U.S.C. 154(b) by 456 days.

(21) Appl. No.: 13/075,876

(22) Filed: Mar. 30, 2011

(65) Prior Publication Data

US 2012/0249355 A1  Oct. 4, 2012

(51) Int. Cl.
*G01S 13/62* (2006.01)

(52) U.S. Cl.
USPC ............... 342/28; 342/83; 342/114; 342/175

(58) Field of Classification Search
USPC .......................... 342/28, 82, 83, 114, 175
See application file for complete search history.

(56) References Cited

U.S. PATENT DOCUMENTS

| | | | | |
|---|---|---|---|---|
| 3,703,722 A * | 11/1972 | Gershberg et al. | ............... | 342/28 |
| 3,815,133 A * | 6/1974 | Yasusaka et al. | ............. | 342/104 |
| 3,832,709 A * | 8/1974 | Klein et al. | ................... | 342/127 |
| 4,083,049 A * | 4/1978 | Mattern et al. | .................. | 342/28 |
| 4,535,286 A * | 8/1985 | Sullivan, Jr. | ................ | 324/76.45 |
| 5,519,400 A * | 5/1996 | McEwan | .......................... | 342/28 |
| 5,596,325 A * | 1/1997 | Maas | .............................. | 342/28 |
| 5,682,164 A * | 10/1997 | McEwan | .......................... | 342/27 |
| 6,239,736 B1 * | 5/2001 | McDonald et al. | ............. | 342/28 |
| 2006/0022866 A1 * | 2/2006 | Walton et al. | .................. | 342/194 |
| 2012/0249355 A1 * | 10/2012 | Haugen et al. | .................. | 342/21 |
| 2013/0106644 A1 * | 5/2013 | Haugen et al. | .................. | 342/28 |

* cited by examiner

*Primary Examiner* — John B Sotomayor
(74) *Attorney, Agent, or Firm* — John P. Wooldridge

(57) ABSTRACT

A homodyne motion sensor or detector based on ultra-wideband radar utilizes the entire received waveform through implementation of a voltage boosting receiver. The receiver includes a receiver input and a receiver output. A first diode is connected to the receiver output. A first charge storage capacitor is connected from between the first diode and the receiver output to ground. A second charge storage capacitor is connected between the receiver input and the first diode. A second diode is connected from between the second charge storage capacitor and the first diode to ground. The dual diode receiver performs voltage boosting of a RF signal received at the receiver input, thereby enhancing receiver sensitivity.

15 Claims, 3 Drawing Sheets

FULL-WAVE RECEIVER ARCHITECTURE FOR THE HOMODYNE MOTION SENSOR

GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND OF THE INVENTION

1. Field of the Invention

This invention pertains generally to motion sensors, and more particularly to homodyne and other gated or sampling motion sensors based on ultra-wideband (UWB) radar, and most particularly to the receiver in an UWB radar homodyne or other gated or sampling motion sensor.

2. Description of Related Art

Motion detectors, in essence, are evaluated by the success rate of their detection. The reliability of the output of the motion detectors depends largely on the sensitivity of the receiver portion of the motion detectors. Therefore, it is highly desirable to achieve the highest sensitivity at the front-end of the circuit.

Homodyne and impulse motion sensors or detectors based on wideband and ultra-wideband (UWB) radar signals technology have been developed at Lawrence Livermore National Laboratory (LLNL). Both the homodyne and sampling impulse motion sensors include a transmitter and a receiver. In a homodyne system, the transmitter sends out two short bursts of RF per repetition that are separated by a pre-configured distance in time. The second burst will mix with the returned signal from the first transmitted burst. Similarly, in an impulse sampling system, two short pulses separated by a pre-configured distance in time are transmitted per repetition, and the second pulse will mix with the returned signal from the first pulse. If the object in motion is at the distance that corresponds to the separation between the two bursts or pulses, the mixing will create a waveform with the motion artifacts at the output of the receiver at the pulse repetition frequency of the transmitter. Typically, the motion sensors developed at LLNL are homodyne sensors using RF bursts for transmission and reception.

Various techniques exist to down-convert and analyze the incoming RF signal or pulses (the returned signal from the first transmitted RF burst or pulse). How well the selected technique transforms the input signal is one of the parameters that determines the sensitivity of the receivers.

Historically, homodyne motion sensors at LLNL have used a receiver implementation that involves only a single RF detector diode. The nonlinear relationship of voltage and current through the diode allows it to generate nonlinear terms, including the term with no frequency content. With a single diode, however, only the positive or negative half of the waveform coming through the antenna is utilized while the other half is discarded. Therefore, the prior technique limits the sensitivity of detection and leaves room for improvement where the entire waveform is translated to a useful output.

Accordingly it is desirable to provide a receiver architecture that utilizes the entire received RF signal in a homodyne motion sensor.

SUMMARY OF THE INVENTION

An aspect of the invention is a voltage boosting receiver for a homodyne or sampling motion sensor, including: a receiver input; a receiver output; a first diode whose output is connected to the receiver output; a first charge storage capacitor connected from between the first diode and the receiver output to ground; a second charge storage capacitor connected between the receiver input and the first diode; and a second diode connected from between the second charge storage capacitor and the first diode to ground; wherein the receiver performs voltage doubling of a RF signal received at the receiver input.

Another aspect of the invention is a homodyne motion sensor including a transmitter and a voltage boosting receiver as above.

A further aspect of the invention is a homodyne motion sensor including a transmitter having an oscillator, a short burst generator connected to the oscillator, and a transmit antenna connected to the short burst generator; and a receiver having an oscillator, a short burst generator connected to the oscillator, an averaging sampler connected to the short burst generator, and a receive antenna connected to the averaging sampler; wherein the averaging sampler is a voltage boosting receiver as above.

Further aspects of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Referring more specifically to the drawings, for illustrative purposes the present invention is embodied in the apparatus generally shown in FIG. 3 through FIG. 6. It will be appreciated that the apparatus may vary as to configuration and as to details of the parts, without departing from the basic concepts as disclosed herein.

The invention applies to a homodyne motion sensor or to any other gated or sampling detector based on short burst radar. The invention applies to ultra-wideband (UWB) systems and also to wideband systems that are not UWB. The invention will hereinafter be described in terms of an UWB homodyne motion sensor, but also applies to other gated or sampling systems and to wideband systems as well as UWB. The invention enhances the sensitivity of the receiver for homodyne motion sensors by about two fold over the prior art by utilizing the entire received waveform through implementation of a full-wave receiver.

Figure 1:
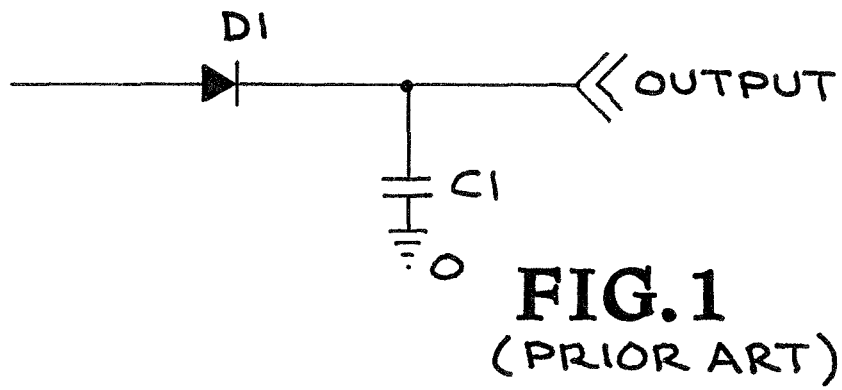
FIG. 1 is a schematic diagram of a prior art single diode receiver for a homodyne motion sensor.

FIG. 1 shows a prior art receiver for a homodyne motion sensor that includes only a single diode and therefore performs half-wave rectification of an incoming signal, i.e. it only utilizes half the incoming signal and discards the other half. The motion sensor has a single diode D1. The receiver input is connected to the anode of D1, and the cathode of D1 is connected to the receiver output, i.e. diode D1 is connected in the forward direction between the receiver input and output. D1 could also be connected in the reverse direction, in which case only the negative half of the signal would be utilized instead of the positive half. A capacitor C1 is also connected from the cathode of diode D1 to ground. Capacitor C1 acts as a charge storage capacitor and integrator for the rectified signal coming out of D1. C1 essentially integrates the enveloped, high frequency RF signal coming out of D1 into a low frequency baseband signal.

Their nonlinear characteristics allow diodes to function as rectifiers when connected in series with an incoming RF signal, as in the receiver circuit of FIG. 1. The current through the diode exponentially increases as the voltage across the diode increases linearly in the forward direction. Using the Taylor series approximation on this exponential current to voltage relationship reveals that the resulting current through the diode due to the incoming waveform consists of the frequency independent (i.e. DC) term and the harmonic terms of the center frequency of the waveform. The DC term can be extracted out of the resulting approximation by proper filtering, i.e. basically by C1.

Figure 2:
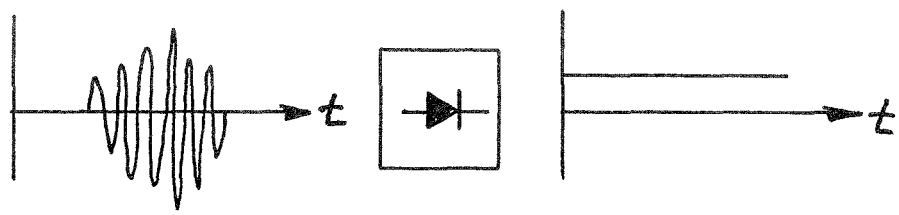
FIG. 2 illustrates the rectification and filtering of an RF waveform by the receiver of FIG. 1 to produce a DC output.

FIG. 2 shows the rectification and filtering of a RF waveform through a series diode, as in the prior art receiver of FIG. 1. Due to the directionality of diodes, only the portion of the waveform that forward biases the diode will go through rectification while the other half is essentially thrown out. As shown, with the signal applied to the anode of the diode, only the positive part of the signal is passed. If the diode were reversed, i.e. the signal applied to the cathode, then only the negative part of the signal would pass. The rectified portion of the RF waveform produces a DC output of a certain level as shown.

While this technique serves the end purpose of detecting motion, it still leaves room for improvement in sensitivity. The sensitivity of the receiver directly depends on the amount of the waveform that is converted to the DC term at the output. Theoretically, if the entire waveform, both the positive and negative halves, is used, a factor of two enhancement in the sensitivity will be observed.

Figure 3:
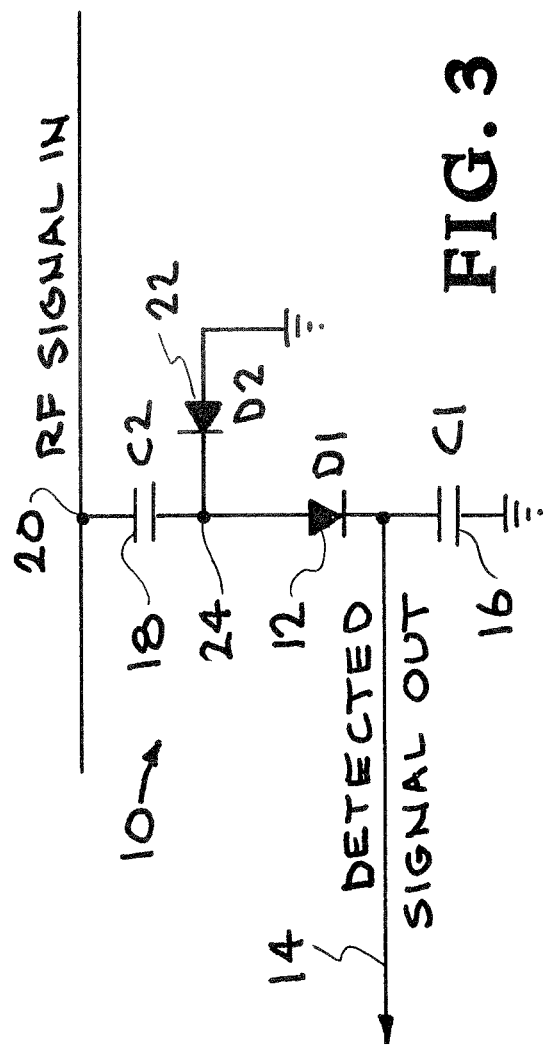
FIG. 3 is a schematic diagram of a dual diode, voltage doubling receiver of the invention for a homodyne motion sensor.

FIG. 3 shows a dual diode, voltage doubling receiver 10 having a circuit structure configured for voltage boosting of the incoming RF signal. Receiver 10 has a first diode (D1) 12 whose output is connected to receiver output 14 and also through first charge storage capacitor (C1) 16 to ground, as in the receiver of FIG. 1. First diode (D1) 12 is also connected through a second charge storage capacitor (C2) 18 to receiver input 20. A second diode (D2) 22, a shunt diode to ground, is connected between second charge storage capacitor (C2) 18 and first diode (D1) 12 to ground. The function of second diode (D2) 22 is to provide a voltage boosted output from a single tap on the received RF line (input 20) so that the negative half of the returned waveform can also be utilized by the receiver 10. C1 may be referred to as the positive peak-to-peak storage capacitor or just the peak-to-peak storage capacitor, and C2 may be referred to as the negative peak storage capacitor.

First diode (D1) 12 and second diode (D2) 22 are connected at node (N1) 24. First diode (D1) 12 and second diode (D2) 22 are connected in opposed directions from node (N1) 24, i.e. in a series configuration. The anode of first diode (D1) 12 is connected to node (N1) 24 while the cathode of second diode (D2) 22 is connected to node (N1) 24, i.e. the cathode of second diode (D2) 22 is connected to the anode of first diode (D1) 12 through node (N1) 24, so first diode (D1) 12 is connected in the forward direction from node (N1) 24 to output 14 while second diode (D2) 22 is connected in the reverse direction from node (N1) 24 to ground. Thus one diode will be conducting on the positive voltage and the other on the negative voltage.

The pair of diodes (D1, D2) 12, 22 and capacitor (C2) 18 provide voltage boosting of the receiver input signal. During the positive half cycle, the first diode (D1) 12 is conducting, as in the receiver of FIG. 1, and the second (shunt) diode (D2) 22 is not conducting, so the system operates as before.

During the negative half cycle, the charge storage capacitor (C2) 18 is charged to the negative peak value while first diode (D2) 22 conducts. The node (N1) 24 between first diode (D1) 12 and second diode (D2) 22 will be held to the negative of the forward voltage drop of the second diode (D2) 22. First diode (D1) 12 is reverse biased and is off. From the negative peak to the positive peak, charge storage capacitor (C2) 18 will pull node (N1) 24 to the peak to peak voltage minus the forward voltage drop of second diode (D2) 22. The first diode (D1) 12 will be forward biased and will start conducting until node (N1) 24 is pulled low enough to reverse bias first diode (D1) 12. The shunt diode (D2) 22 essentially pulls node (N1) 24 to ground, allowing the entire waveform to be rectified.

Starting with a negative going waveform on the RF signal line, D2 will conduct when the RF signal is above the turn-on threshold. N1 (one side of C2) will be clamped to the turn-on threshold of D2. The other side of C2 (the RF signal line) will charge to the most negative peak value. The net voltage across C2 will be the negative peak value minus the diode D2 turn-on voltage drop. When the RF signal returns to zero, D2 will become reverse biased and N1 will have a positive voltage on it with respect to ground. This will forward bias D1 and transfer some of the charge from C2 to C1. At this point C1 will have some voltage developed across it. On the positive half cycle of the RF waveform, D1 will conduct and C1 will be charged to the positive peak of the RF signal (minus the diode drop of D1) plus the voltage that is stored on C2. Over many cycles, the voltage value of C1 will reach close to the peak-to-peak value of the RF waveform voltage. The final value of the voltage on C1 depends on the RF burst width, the impedance of the detected signal output, the pulse repetition rate, and the values of C1 and C2.

Figure 4:
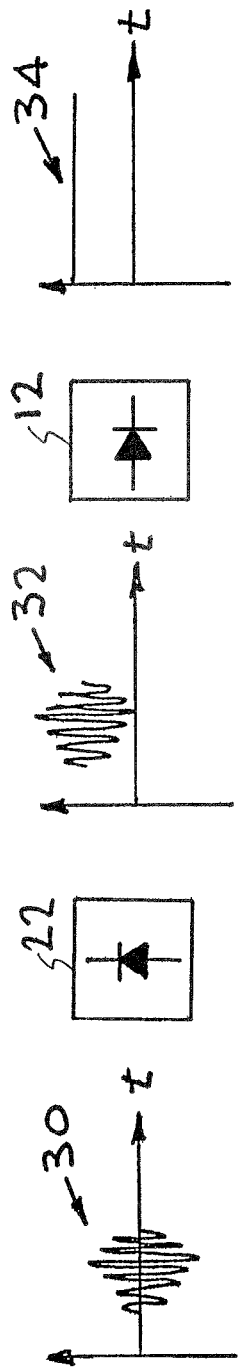
FIG. 4 illustrates the rectification and filtering of a RF waveform by the receiver of FIG. 3 to produce a DC output.

The resulting waveform 32 at node (N1) 24 will be approximately equal to the input waveform 30 with a DC offset, as shown in FIG. 4. The voltage boosted and filtered DC output signal 34 is much greater than, essentially about two times greater, than the prior art half-wave rectified DC output shown in FIG. 2. The output voltage will be at a value below the peak to peak voltage of the input voltage minus the voltage drop of diodes (D1, D2) 12, 22 but the exact value will depend on the value of capacitor (C1) 16. The output voltage will be updated at the rate of the pulse repetition rate of the transmitter.

While first diode (D1) 12 has been shown as forward biased on the positive signal and second diode (D2) 22 as reverse biased on the positive signal, the orientations of the diodes may be reversed, i.e. the first diode (D1) 12 forward biased on the negative signal and the second diode (D2) 22 reverse biased on the negative signal. The roles of the positive and negative parts of the waveforms are then just reversed.

Thus the invention provides a simple and effective way to utilize the entire input waveform in a sampling type receiver such as in a homodyne motion sensor. It might seem that two polarity reversed diodes could be connected to the RF receive path, i.e. provide two parallel duplicate paths as in FIG. 1. But in that configuration, there would be two separate output signals, one that is positive and one that is negative with respect to ground, that would need to be added together to get the peak-to-peak voltage. The advantage of the present invention is that the output is one "single ended" output, i.e. one polarity referenced to ground.

The present invention provides a better system by maintaining a single diode connected to the RF path, and using the AC characteristics of the received RF signal to create a type of voltage doubling receiver.

Figure 5:
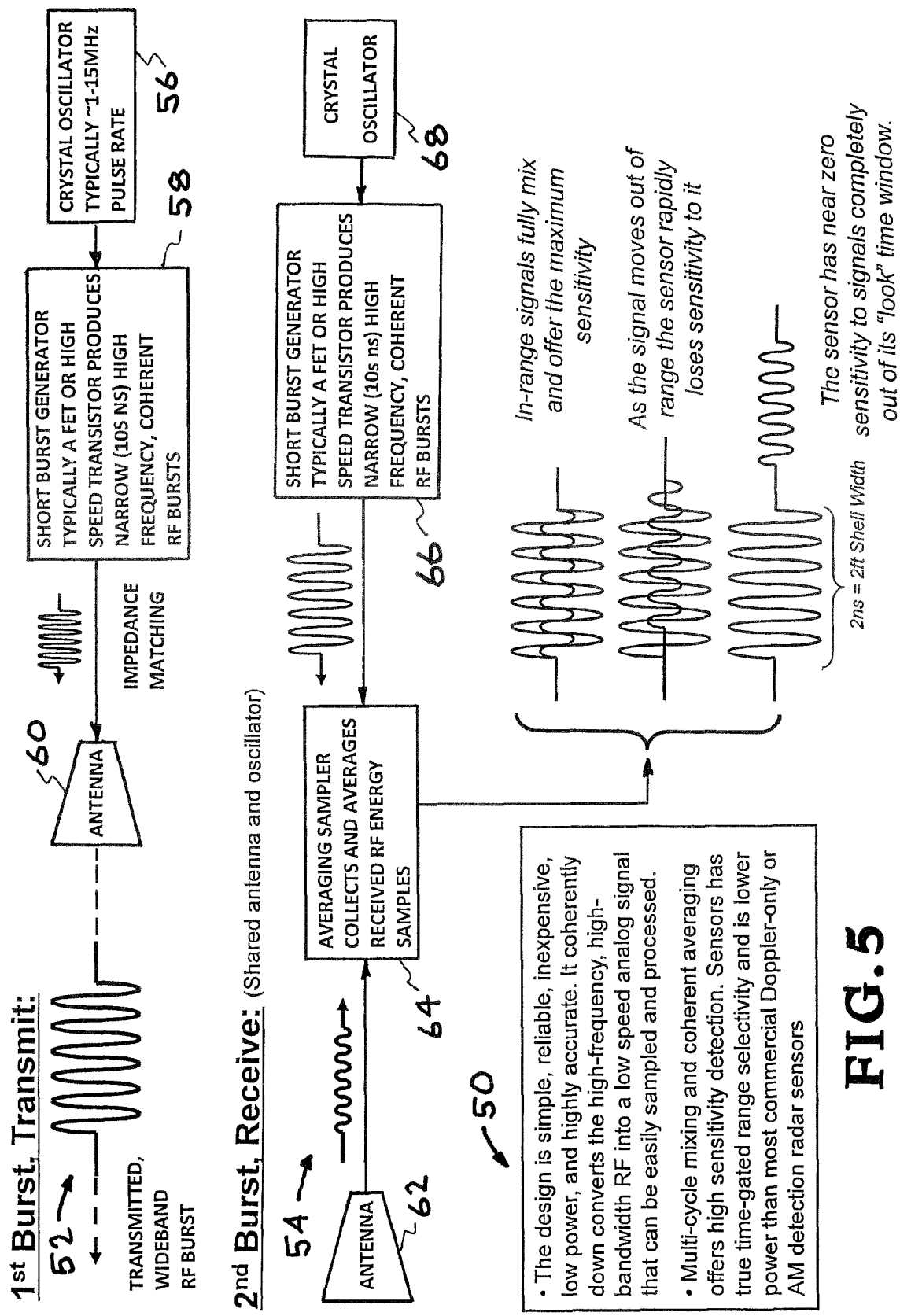
FIG. 5 is a schematic diagram of a homodyne motion sensor of the invention.

FIG. 5 shows a homodyne motion sensor 50 of the invention, having a transmitter 52 and a receiver 54. Transmitter 52 and receiver 54 may be integrated into a single unit called a transceiver or may be two separate units.

In transmitter 52, an oscillator 56 provides input pulses to a short burst generator 58. Oscillator 56 typically operates at a pulse repetition rate of 100 kHz-15 MHz and may be a crystal oscillator. Short burst generator 58 is typically a FET or BJT, and produces narrow (e.g. 10's of ns) high frequency coherent RF bursts. Short burst generator 58 can produce wideband or ultra-wideband (UWB) signals. Generally a pair of bursts, separated in time corresponding to a certain range, are produced on each cycle of oscillator 56. Short burst generator 58 is connected to antenna 60, typically with impedance matching, to transmit these wideband RF bursts.

Figure 6:
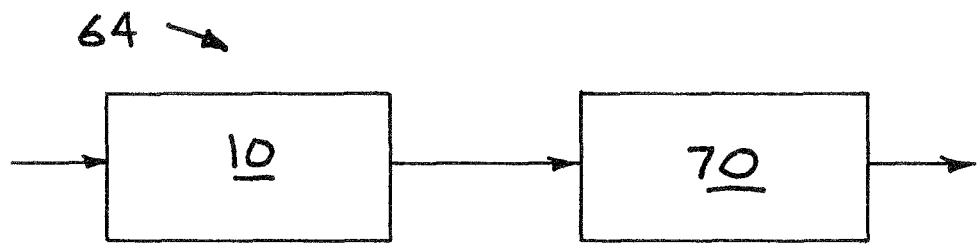
FIG. 6 is a schematic diagram of an averaging sampler of a homodyne motion sensor of the invention, including a voltage doubling receiver of FIG. 3.

When the RF bursts transmitted from antenna 60 hit a moving target, reflected pulses are received by antenna 62 of receiver 54. Antenna 62 is connected to averaging sampler 64 of receiver 54. Averaging sampler 64 is implemented with the dual diode, voltage doubling receiver circuit 10 of FIG. 3. As shown in FIG. 6, averaging sampler 64 is formed of voltage doubling receiver 10 followed by a high impedance amplifier 70. Averaging sampler 64 also receives RF bursts from a short burst generator 66 that is driven by an oscillator 68. Short burst generator 66 and oscillator 68 are similar to short burst generator 58 and oscillator 56, and produce a similar sequence of RF bursts that are synchronized with those produced by short burst generator 58. (In an impulse system, the short burst generators 58, 66 are replaced by short pulse generators.) Oscillator 68 may be a crystal oscillator. When the moving target is at the selected range, the reflection from the first burst of each cycle will coincide with the second burst at the averaging sampler 64, producing an output signal indicating detection of a moving target at the selected range.

While a sensor embodiment has been shown with separate transmitter and receiver with separate components, alternate embodiments with shared components may be used. For example, a single antenna may be used to both transmit and receive, e.g. antenna 60 may be connected to averaging sampler 64 so that received signals are input thereto, and a single oscillator and short burst generator may be used to produce the RF bursts, e.g. the output of short burst generator 58 may also be input into averaging sampler 64. In addition, short burst generators 58, 66 may produce just one RF burst per cycle if the output of short pulse generator 66 is delayed by a time corresponding to the desired range. If only a single short pulse generator 58 is used, its output can be connected to averaging sampler 64 through a delay of suitable length.

Homodyne motion sensors based on ultra-wideband (UWB) radar are described in U.S. Pat. Nos. 6,414,627; 5,682,164; 5,512,834; 5,521,600; and 5,519,400, which are herein incorporated by reference. UWB radar receivers are described in U.S. Pat. Nos. 5,345,471; 5,523,760; and 5,630,216, which are herein incorporated by reference.

The invention thus provides an ultra-wideband (UWB) radar homodyne motion sensor having a voltage boosting receiver that enhances receiver sensitivity. The increased receiver sensitivity allows greater accuracy in decoding the returned RF signal, which will result in higher probability of detection. Homodyne and sampling motion sensors have been successfully integrated into various applications such as Guard Dog Intrusion Sensors, Human Triggered Switches, and the Secure Box Sensors at Lawrence Livermore National Laboratory. Its ease of integration comes from the miniature size of the substrate and off-the-shelf components. The present invention provides motion sensors with greater sensitivity for these and other applications.

Although the description above contains many details, these should not be construed as limiting the scope of the invention but as merely providing illustrations of some of the presently preferred embodiments of this invention. Therefore, the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present invention, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

What is claimed is:

1. An apparatus, comprising:
   a receiver input;
   a receiver output;
   a first diode whose output is connected to the receiver output;
   a first charge storage capacitor connected from between the first diode and the receiver output to ground;
   a second charge storage capacitor connected between the receiver input and the first diode; and
   a second diode connected from between the second charge storage capacitor and the first diode to ground, wherein the receiver performs voltage boosting of a RF signal received at the receiver input.

2. The apparatus of claim 1, wherein the first and second diodes are oriented so they have opposed biases on positive voltages.

3. The apparatus of claim 2, wherein the first diode is oriented to be forward biased and the second diode is oriented to be reverse biased on positive voltage.

4. The apparatus of claim 1, further comprising a transmitter for transmitting a sequence of RF bursts, wherein when said receiver receives at least a portion of said RF bursts and receives at least a portion of reflected signals from said RF bursts, said receiver is configured to combine said portion of RF bursts and said portion of said reflected signals.

5. The apparatus of claim 2, further comprising a transmitter for transmitting a sequence of RF bursts, wherein when said receiver receives at least a portion of said RF bursts and receives at least a portion of reflected signals from said RF bursts, said receiver is configured to combine said portion of RF bursts and said portion of said reflected signals.

6. The apparatus of claim 3, further comprising a transmitter for transmitting a sequence of RF bursts, wherein when said receiver receives at least a portion of said RF bursts and receives at least a portion of reflected signals from said RF bursts, said receiver is configured to combine said portion of RF bursts and said portion of said reflected signals.

7. The apparatus of claim 4, wherein the transmitter is an ultra-wideband radar transmitter.

8. The apparatus of claim 5, wherein the transmitter is an ultra-wideband radar transmitter.

9. The apparatus of claim 6, wherein the transmitter is an ultra-wideband radar transmitter.

10. A homodyne motion sensor, comprising:
a transmitter comprising an oscillator, a short burst generator connected to the oscillator, and a transmit antenna connected to the short burst generator; and
a receiver comprising an oscillator;
a short burst generator connected to the oscillator;
an averaging sampler connected to the short burst generator; and
a receive antenna connected to the averaging sampler, wherein the averaging sampler comprises:
a receiver input;
a receiver output;
a first diode whose output is connected to the receiver output;
a first charge storage capacitor connected from between the first diode and the receiver output to ground;
a second charge storage capacitor connected between the receiver input and the first diode; and
a second diode connected from between the second charge storage capacitor and the first diode to ground, wherein the receiver performs voltage boosting of a RF signal received at the receiver input.

11. The sensor of claim 10, wherein the transmitter is a wideband or an ultra-wideband radar transmitter.

12. A homodyne motion sensor, comprising:
a transmitter comprising an oscillator, a short burst generator connected to the oscillator, and a transmit antenna connected to the short burst generator; and
a receiver comprising an oscillator;
a short burst generator connected to the oscillator;
an averaging sampler connected to the short burst generator; and
a receive antenna connected to the averaging sampler, wherein the averaging sampler comprises:
a receiver input;
a receiver output;
a first diode whose output is connected to the receiver output;
a first charge storage capacitor connected from between the first diode and the receiver output to ground;
a second charge storage capacitor connected between the receiver input and the first diode; and
a second diode connected from between the second charge storage capacitor and the first diode to ground, wherein the receiver performs voltage boosting of a RF signal received at the receiver, wherein the first and second diodes are oriented so they have opposed biases on positive voltages.

13. The sensor of claim 12, wherein the transmitter is a wideband or an ultra-wideband radar transmitter.

14. A homodyne motion sensor, comprising:
a transmitter comprising an oscillator, a short burst generator connected to the oscillator, and a transmit antenna connected to the short burst generator; and
a receiver comprising an oscillator;
a short burst generator connected to the oscillator;
an averaging sampler connected to the short burst generator; and
a receive antenna connected to the averaging sampler, wherein the averaging sampler comprises:
a receiver input;
a receiver output;
a first diode whose output is connected to the receiver output;
a first charge storage capacitor connected from between the first diode and the receiver output to ground;
a second charge storage capacitor connected between the receiver input and the first diode; and
a second diode connected from between the second charge storage capacitor and the first diode to ground, wherein the receiver performs voltage boosting of a RF signal received at the receiver input, wherein the first and second diodes are oriented so they have opposed biases on positive voltages and wherein the first diode is oriented to be forward biased and the second diode is oriented to be reverse biased on positive voltage.

15. The sensor of claim 14, wherein the transmitter is a wideband or an ultra-wideband radar transmitter.

* * * * *